Dec. 9, 1958  P. D. SCHUMAN ET AL  2,863,174
PRODUCTION OF PREFORMS AND LONGITUDINALLY CURVED ARTICLES
OF POLYTETRAFLUOROETHYLENE RESIN
Filed Sept. 5, 1956

INVENTORS
Paul D. Schuman
BY Edward J. Chu

Churchill, Rich, Weymouth & Engel
ATTORNEYS.

United States Patent Office 2,863,174
Patented Dec. 9, 1958

2,863,174

PRODUCTION OF PREFORMS AND LONGITUDINALLY CURVED ARTICLES OF POLYTETRAFLUOROETHYLENE RESIN

Paul D. Schuman, Sayreville, and Edward J. Chu, Belleville, N. J., assignors to Resistoflex Corporation, Roseland, N. J., a corporation of New York Application September 5, 1956, Serial No. 608,135

14 Claims. (Cl. 18—55)

The present invention relates to the fabrication of articles from polytetrofluoroethylene resins. More particularly, the invention is related to the extrusion of a paste-like mixture of particles of the polytetrafluoroethylene resin and an extrusion aid, and to the production of curved articles thereof.

As is now known, polytetrafluoroethylene resin (sold under the trademark "Teflon" by E. I. du Pont de Nemours and Company, Inc.) can be admixed with an extrusion aid and compacted into a preform having a paste-like consistency. This preform can then be inserted into a ram-type extruder and forced through a small orifice die to provide thin-walled sections. This is the method presently employed for producing thin-walled tubing of the above resin. When tubing is produced in this manner and thereafter sintered, it has a reasonable amount of flexibility. However, as is common to tubing in general, a given tube of a particular diameter and wall thickness will have a minimum bending radius beyond which the walls of the tube will collapse. For example, a tube produced by the above method with an inside diameter of ⅞ of an inch and an outside diameter of 1½₂ inch will have a minimum bending radius measured to the inside surface of the bent tube of approximately 7⅜ inches. If an attempt is made to bend such a tube to a greater degree the wall of the tube will collapse unless some internal support is provided. In certain applications, however, it is desirable to be able to bend such a tube into tighter configurations.

The problem is not limited to tubing but will be found in attempting to bend other types of thin-walled sections. Consider, for example, the production of a curved strip having a rectangular cross-section with the major dimension in the plane of the bend. In this instance excessive bending would cause buckling of the material.

In accordance with the present invention, a method has been found for producing articles of polytetrafluoroethylene resin which have an inherent curve or bend imparted thereto permitting them to assume bends of much tighter or smaller radius than those heretofore possible. Basically the method comprises supplying predetermined different areas of a forming die each with particles of said resin admixed uniformly with different concentrations of an extrusion aid, the concentrations differing in an unsymmetrical manner about a central point of the die, and forcing the admixtures simultaneously through the corresponding areas of the die to form a unitary article with longitudinal curvature therein. That is, it has been discoveerd that if the die is supplied with material in an unsymmetrical manner as to flow or fluidity the extrude will be produced with an inherent curvature. Subsequent sintering of the curved article will not remove the curvature but, in fact, will cause the extrude to knit into a tight or homogeneous article inherently curved.

As a further part of the invention there are provided preforms having a novel construction and composition as well as a novel method of forming same.

The invention will be better understood after reading the following detailed description thereof in connection with the appended drawings wherein.

Figure 1:
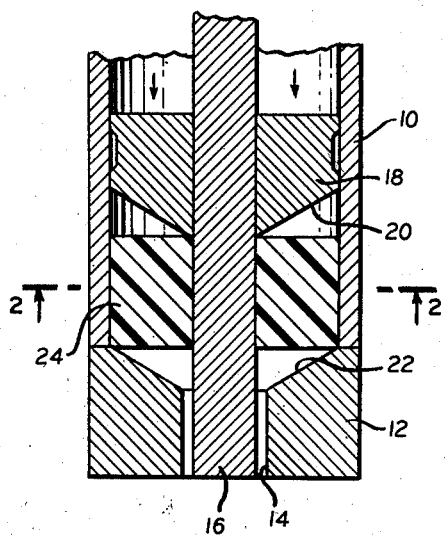
Fig. 1 is a diagrammatic representation of a ram-type extruder set up for extruding tubing prior to commencement of the stroke of the ram.
Figure 2:
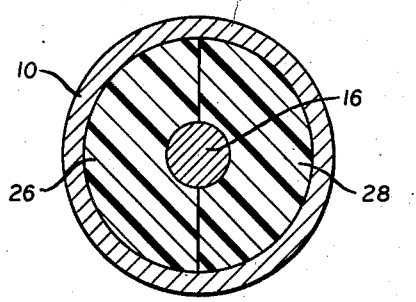
Fig. 2 is a sectional view on line 2—2 of Fig. 1 showing the cross-sectional construction of the preform.

Referring now to the drawings, Figs. 1 and 2 show diagrammatically the essential elements of a ram-type extruder and the preform employed therewith. The extruder chamber or cylinder is shown at 10. A die 12 with a cylindrical bore or orifice 14 is secured to thte open end of the chamber 10. A cylindrical core pin or mandrel 16 is supported by means, not shown, concentric with the bore 14. The ram is shown at 18 and is provided with a conical face 20 to match the conical entrance 22 of the die 12. The ram 18 is mounted on the core pin 16 and is driven in the axial direction by conventional means, not shown on the drawing.

Fig. 1 shows the extruder already charged with a hollow cylindrical preform 24 immediately prior to the forward stroke of the ram. It is to be understood that means are provided for withdrawing the ram from the breech of the chamber 10 or otherwise permitting the preform 24 to be inserted. For this purpose the preform may be divided longitudinally into the half sections 26 and 28 as best seen in Fig. 2.

In the production of straight lengths of tubing by the above apparatus the preform may be prepared as described in United States Patent No. 2,752,321. The method described therein includes the preparation of what is designated as a typical lubricant-polymer composition which can be employed in the preparation of the preform. The composition as set forth therein is as follows:

| | Parts |
|---|---|
| "Teflon" tetrafluoroethylene resin | 81.0 |
| V. M. P. naphtha (specific gravity .74 boiling range 90° to 170° C.) | 17.0 |
| Chrome yellow pigment[1] | 1.8 |
| "Vistanex" polyisobutylene thickener | 0.2 |

[1] Medium Y-469-DR from the Pigments Division of E. I. du Pont de Nemours & Company, Inc.
(In the above formula "Vistanex" is the registered trademark of the Enjay Company for their high-molecular weight hydro-carbon polymer of isobutylene.)

The V. M. P. naphtha after being thickened with the polyisobutylene thickener is then mixed with the resin by tumbling in a closed container for a short interval of time. Say 10-15 minutes. The mixture is then placed in a cylindrical mold. Pressure is applied of from 50 to 100 pounds per square inch in order to compact the mixture into a preform. The preform may then be cut into two sections with a razor blade or the like or instead the mold may be provided with a partition to provide the half sections.

If a preform produced in the manner described above is placed in the extruder and forced through the die by the ram, it will extrude in the form of a straight tube. The extrude will be somewhat fragile and fiber-like. It must then be heated at a suitable temperature to drive off the extrusion aid, which in this case is the naphtha and "Vistanex." The temperature employed may be of the order of 150° C. (300° F.). After the extrusion aid has been driven off the tube must be sintered at the sintering temperature of the resin which is of the order of 375° C. (700° F.). The process described thus far is entirely conventional for the resin involved and forms no part of the present invention.

Figure 3:
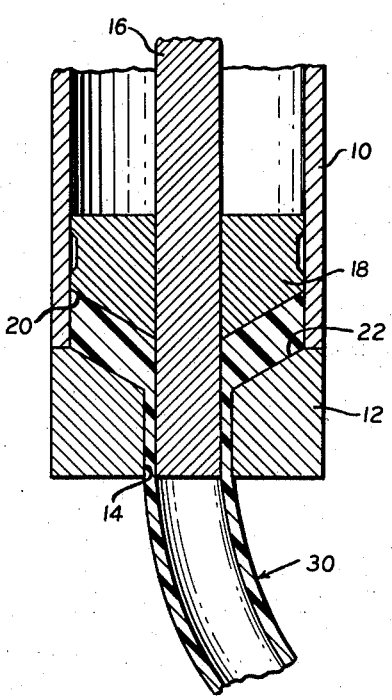
Fig. 3 is a diagrammatic view of the ram-type extruder of Fig. 1 with the ram at an intermediate point in its stroke showing the production of an extrude with inherent curvature as it leaves the die.

In the above formula the concentration of extrusion aid will be observed to be approximately 17% of the total mixture. It has been discovered that if the preform is modified by changing the concentration of extrusion aid on one side thereof unusual results will obtain. As one example of the invention, instead of forming both sections 26 and 28 of Fig. 2 from a mixture prepared in accordance with the above formula, a preform can be prepared with one half section, say 26, containing 17% extrusion aid, as above, whereas the other half section, 28, can be provided with an increased amount of extrusion aid, say of the order of 19%. In each case the extrusion aid is uniformly distributed throughout the resin. When this preform is forced through the die by the ram, the resulting tube will extrude in a curved manner as shown at 30 in Fig. 3. It has been ascertained that the material containing the higher extrusion air content forms the outside of the curve whereas the material with the lower lubricant content forms the inside of the curve. With a ½–17%:½–19% preform, as above, a tube having a wall thickness of about 0.060 inch and an inside diameter of about 0.375 inch was extruded with a radius of curvature of 3½ to 4 inches.

Although satisfactory results were obtained using a half and half arrangement of the preform in the production of small diameter tubing, it did not prove satisfactory for tubing of 1 inch inside diameter and larger. Instead a preform was prepared with one part consisting of ⅞ of the entire body or 315° of arc and the other part of only ⅛, i. e. a "wedge" of 45° of arc.

For convenience and flexibility only two preform molds were used. One mold was arranged to provide a complete hollow cylinder from which a longitudinal segment or "wedge" of desired size or angular width could be removed with a razor blade or similar sharp implement. Thus a first preform section such as section 32 in Fig. 4 was prepared with a segment of 45° of arc removed therefrom. See the gap 34.

Figure 4:
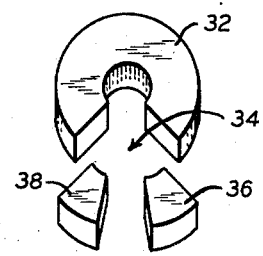
Fig. 4 shows a preferred modification of the preform which can be used in the practice of the invention.

The second mold was designed to provide a component "wedge" of 22½° of arc from which the sections 36 and 38 of Fig. 4 were prepared. As evident from Fig. 4, two such "wedges" were employed to fill up the 45° gap 34 in the main section 32. As will appear hereinafter it may be desirable in certain instances to use only one 22½° "wedge" in a 22½° gap. In a broad sense, therefore, the section 32 of Fig. 4 has removed therefrom a segment of $nx°$ of arc where $n$ is a positive integer including 1 and $x$ is the angular width of a component "wedge."

It was also necessary to vary the formulae somewhat to retain the same radius of curvature, i. e. between 3½ and 4 inches, with the new diameter of 1 inch. Thus, the ⅞ section designated 32 in the drawing was formed from a mixture containing 16% naphtha-Vistanex, whereas the sections 36 and 38 were formed from a mixture containing 20% extrusion aid.

It should be apparent by now that the preform has more extrusion aid on one side of a given dividing plane than on the other. The preform will have an axis in the direction of which it will be extruded. In order to produce a curved extrude there must be a lack of symmetry about this axis over at least some portion of the preform. The method disclosed herein has innumerable variations of which only a few examples will be set forth. The assumption throughout this description is that the entire extrude is to be curved and, thus, the "wedge" of the preform extends throughout its entire length. Of course, the "wedge" could be localized in which case part of the extrude would be straight and part would be curved.

Because of the extremely volatile nature of the naphtha in the above formula, it is rather difficult to control the curvature of the end product. Where reproduceable results are desired a less volatile extrusion aid is preferred.

One that has been found to possess the necessary attributes is a white oil having a specific gravity between 0.775 and 0.785 at 60° F. and sold under the trademark "Deobase" by L. Sonneborn Sons, Inc.

Following are three different mixes which have provided excellent results.

|  | Mix A | Mix B | Mix C |
| --- | --- | --- | --- |
| "Teflon"—TE-3086 gms | 89.8 | 90.8 | 122.5 |
| Carbon black gms | 0.09 | 0.09 | 0.12 |
| "Deobase" Oil cc | 24.3 | 23.1 | 28.9 |

Mixes A, B, and C contain, respectively, approximately 17%, 16% and 15% by weight of extrusion aid.

The preferred procedure is to weight out the desired quantity of Teflon powder and sift through a 10 mesh screen. Add the carbon black. Tumble mix until carbon black appears well dispersed, re-sift. Add the "Deobase" oil in 10 cc. portions using a burette or similar means, capping mixture and shaking vigorously after each addition. Sift again to separate "balled" or "lumpy" material containing excess oil. Force this "balled" material gently through the screen, taking care to minimize smearing. Add to original mix. Finally tumble mixture to insure blending of material. This material can then be compacted under a pressure of 10 to 50 p. s. i. into the desired preform.

A tube having a radius of curvature of 3½ inches, an inside diameter of approximately 1 inch, and a wall thickness of about 0.062 inch was extruded from a preform wherein the major portion occupied 15/16 or 337½° of the body and was formed from mix A, whereas the "wedge" portion occupied 1/16 or 22½° of the body and was formed from mix B.

Forcing a preform having a major portion of ⅞ or 315° of mix A and a "wedge" of ⅛ or 45° of mix C through a die for producing a 1½ inch inside diameter tube with a .062 inch wall thickness developed an extrude having a 4 inch radius of curvature. The same preform construction and composition when forced through a 2 inch die developed an extrude with a 4½ inch radius of curvature.

Proper post treatment of the extrudes formed from the above mixes A, B, and C includes heating the extrudes on a suitable support in an air circulating oven at about 160° F. for 3 hours, purging or exhausting the oven frequently to remove vapors. Then the temperature should be raised to about 750° F. for approximately 15 minutes. After this time remove the extrudes from the oven and water quench.

In all of the above examples due allowance must be made for the shrinkage of polytetrafluoroethylene resin when sintered. This may amount to 30% or 40% in the direction of extrusion and to about 5% in the transverse direction.

No attempt has been made to set forth more than a few examples sufficient to explain the invention. Naturally the size of the "wedge" in any given preform may be varied as well as the relative percentages of the extrusion aid. However, as a general rule it is advisable to restrict the range of the extrusion aid when naphtha is employed to between 14% and 22%. When the "Deobase" oil is employed the percentages may be satisfactorily varied between 14% and 21%. Outside of the above limits the extruded structure is liable to be rough, grooved, or stringy and otherwise unsatisfactory.

Carbon black as used in mixes A, B and C is an extrusion aid which assists in obtaining a uniform distribution of the "Deobase" oil throughout the mix. Details of its use and effect on the mix will be found in United States Patent No. 2,752,637 issued July 3, 1956 and assigned to the assignee of the instant application.

Other extrusion aids besides the thickened V. M. P. naphtha and the "Deobase" oil may be used but its viscosity should lie within the range of 3 to 5 centipoises.

This is also true of the naphtha-"Vistanex" solution and the oil as employed in the above formulations.

Although the invention has been described in terms of preparing a preform from the resin and extrusion aid, this may not be essential. If the separate mixes required for the curved extrusion can be supplied directly to separate areas of the forming die by multiple feed arrangements or the like preforming can in certain instances be omitted.

The invention as described herein provides an article after sintering which is substantially stress-free and dimensionally stable.

It will be apparent from the above description that conical preforms may be used in a known manner and that the invention is susceptible of wide variation and modification and, therefore, the foregoing should not be construed as limiting the invention as defined in the claims appended hereto.

What we claim is:

1. The method of producing longitudinally curved articles of polytetrafluoroethylene resin having a substantially uniform cross-section which comprises forming particles of said resin admixed with an extrusion aid into a preform having extrusion aid asymmetry about the extrusion axis over predetermined portions of the preform, and thereafter forcing said preform in the direction of said extrusion axis through a forming die for producing the desired cross-section so that said predetermined portions of the preform will extrude therefrom at different rates through different areas of said die dependent upon the extrusion aid asymmetry causing the extrude to curve in a desired manner.

2. The method of producing longitudinally curved articles of polytetrafluoroethylene resin having a substantially uniform cross-section which comprises supplying predetermined different areas of a forming die each with particles of said resin admixed uniformly with different concentrations of an extrusion aid, said concentrations differing in an unsymmetrical manner about a central point of said die, and forcing said admixtures simultaneously through the corresponding areas of said die to form unitary articles with longitudinal curvature therein.

3. The method of producing longitudinally curved articles of polytetrafluoroethylene resin having a substantially uniform cross-section which comprises forming particles of said resin admixed with an extrusion aid into a preform having extrusion aid asymmetry about the extrusion axis over predetermined portions of the preform, forcing said preform in the direction of said extrusion axis through a forming die for producing the desired cross-section, and thereafter applying heat thereto to drive off the extrusion aid and sinter the resin, to produce thereby flexible articles having longitudinal curves therein corresponding to said predetermined portions of the preform.

4. The method of producing longitudinally curved articles of polytetrafluoroethylene resin having a substantially uniform cross-section which comprises supplying predetermined different areas of a forming die each with particles of said resin admixed uniformly with different concentrations of an extrusion aid, said concentrations differing in an unsymmetrical manner about a central point of said die, forcing said admixtures simultaneously through the corresponding areas of said die to form unitary articles with longitudinal curves therein, and thereafter applying heat thereto to drive off the extrusion aid and sinter the resin, to produce thereby flexible articles having said longitudinal curves inherently formed therein.

5. The method of producing curved tubing of polytetrafluoroethylene resin having a substantially uniform wall thickness which comprises forming particles of said resin admixed with an extrusion aid into a cylindrical preform having extrusion aid asymmetry about its longitudinal axis over predetermined portions thereof, and thereafter forcing said preform in the direction of said axis through a circular forming die about a mandrel for producing a tubular cross-section so that said predetermined portions of the preform will extrude at different rates around the mandrel through the die orifice dependent upon the extrusion aid asymmetry causing the tubular extrude to curve in a desired manner.

6. The method according to claim 5, wherein the extrusion aid is a mixture of naphtha and a polyisobutylene thickener having a viscosity of between 3 and 5 centipoises, said mixture being admixed with the resin in quantities within the range of 14% to 22% of the total weight of the mix.

7. The method according to claim 5, wherein the extrusion aid is a white oil having a specifc gravity at 60° F. of between 0.775 and 0.785, said oil being admixed with the resin in quantities within the range of 14% to 21% of the total weight of the mix.

8. The method of producing curved tubing of polytetrafluoroethylene resin having a substantially uniform wall thickness which comprises forming particles of said resin admixed with an extrusion aid into a hollow cylindrical preform having a first percentile concentration of said extrusion aid throughout a longitudinal segment occupying 180° of arc or less and a different percentile concentration of said extrusion aid throughout the remainder of the cylinder, and thereafter forcing said preform in the axial direction through a circular forming die about a mandrel for producing a tubular cross-section so that said segment will extrude at a different rate than said remainder simultaneously through the opening between the mandrel and the die causing the tubular extrude to curve as it leaves the die.

9. The method according to claim 8, wherein the percentile concentrations of said extrusion aid lie within the range of 14 to 22 percent by weight of the total weight of the resin and extrusion aid mixture.

10. The method of extruding longitudinally curved articles of polytetrafluoroethylene resin having a substantially uniform cross-section which comprises compacting said resin admixed with an extrusion aid into a preform having extrusion aid asymmetry about the extrusion axis over those portions of the preform which are to extrude with longitudinal curvature, and thereafter extruding said preform through a die for producing the desired cross-section, whereby said portions of the preform will extrude at different rates through different portions of said die dependent upon the extrusion aid asymmetry to cause thereby the desired longitudinal curvature.

11. The method of preparing a preform of polytetrafluoroethylene resin for use in a ram-type extruder provided with a forming die and mandrel for producing tubing which comprises compacting in a hollow cylindrical mold particles of said resin admixed with a first percentile concentration of an extrusion aid, to form a hollow cylinder, removing a first longitudinal segment of said cylinder occupying 180° of arc or less, compacting in a mold corresponding in shape to said removed segment further particles of said resin admixed with a second percentile concentration of said extrusion aid to form a second segment, and inserting said second segment into the gap in said cylinder created by removal of said first segment.

12. The method of preparing a preform of polytetrafluoroethylene resin for use in a ram-type extruder provided with a forming die and mandrel for producing tubing which comprises compacting in a hollow cylindrical mold particles of said resin admixed with a first percentile concentration of an extrusion aid to form a hollow cylinder, removing a first longitudinal segment of said cylinder occupying $nx°$ of arc where $n$ is a positive integer including one and $x$ represents the width in degrees of a component wedge, compacting in a mold corresponding in size and shape to said component wedge further particles of said resin admixed with a second percentile concentration of said extrusion aid to form $n$ wedges, and inserting said $n$ wedges into the gap in said cylinder created by removal of said first segment to form a complete cylindrical preform having extrusion aid asymmetry about the axis of the cylinder.

13. The method according to claim 12, wherein $x$ is equal to 22½°.

14. The method according to claim 13, wherein $n$ is equal to one or two.

References Cited in the file of this patent

UNITED STATES PATENTS

| 182,611 | Stevenson | Sept. 26, 1876 |
| 2,752,321 | Heller | June 26, 1956 |
| 2,752,637 | Walker et al. | July 3, 1956 |